United States Patent
Anton

(10) Patent No.: US 6,845,699 B1
(45) Date of Patent: Jan. 25, 2005

(54) APPARATUS AND A METHOD FOR MANUFACTURING COMPLEX SHAPES

(76) Inventor: Con Anton, 14 - 16 Horne Street, Thomastown, Victoria 3074 (AU)

( * ) Notice: Subject to any disclaimer, the term of this patent is extended or adjusted under 35 U.S.C. 154(b) by 0 days.

(21) Appl. No.: 09/787,173
(22) PCT Filed: Sep. 14, 1999
(86) PCT No.: PCT/AU99/00776
§ 371 (c)(1), (2), (4) Date: May 14, 2001
(87) PCT Pub. No.: WO00/15399
PCT Pub. Date: Mar. 23, 2000

(30) Foreign Application Priority Data

Sep. 14, 1998 (AU) .............................................. PP 5877

(51) Int. Cl.[7] .............................. B26D 7/06; B27C 5/00
(52) U.S. Cl. .............................. 83/439; 83/442; 83/443; 144/144.51; 144/145.2
(58) Field of Search .......................... 83/438, 439, 442, 83/443; 409/178, 93, 130; 434/403, 404, 405; 144/144.51, 145.1, 145.2

(56) References Cited

U.S. PATENT DOCUMENTS

| | | | | |
|---|---|---|---|---|
| 14,268 A | * | 2/1856 | Kern ........................... 83/439 |
| 273,000 A | * | 2/1883 | Wrigley ....................... 83/410 |
| 357,678 A | * | 2/1887 | Maxwell ...................... 83/413 |
| 427,316 A | * | 5/1890 | Harley ....................... 83/441.1 |
| 699,285 A | * | 5/1902 | Clover et al. ............. 144/144.1 |
| 724,433 A | * | 4/1903 | Catudal ........................ 83/416 |
| 1,017,461 A | * | 2/1912 | Pourtauborde ............... 409/93 |
| 1,646,129 A | * | 10/1927 | Wagner ........................ 83/410 |
| 1,728,030 A | * | 9/1929 | Bielski ..................... 144/145.2 |
| 2,261,816 A | * | 11/1941 | Williams ................... 83/441.1 |
| 2,507,982 A | * | 5/1950 | Krause ....................... 409/110 |
| 2,548,698 A | * | 4/1951 | Benge .......................... 83/410 |
| 3,259,021 A | * | 7/1966 | Appleton et al. ........... 409/124 |
| 3,301,287 A | * | 1/1967 | Edwards ................... 144/144.1 |
| 3,442,309 A | * | 5/1969 | Jentsch .................... 144/144.1 |
| 3,614,078 A | * | 10/1971 | Hepler ......................... 266/56 |
| 3,685,556 A | * | 8/1972 | VanSickle .................. 83/409.1 |
| 3,739,826 A | * | 6/1973 | Schell ....................... 144/145.1 |
| 3,800,842 A | * | 4/1974 | Schell ......................... 144/372 |
| 4,036,269 A | * | 7/1977 | Rhodes ...................... 144/48.4 |
| 4,270,426 A | | 6/1981 | Raphael | |
| 4,283,044 A | * | 8/1981 | McKibbin et al. ............. 266/67 |
| 4,644,985 A | * | 2/1987 | Weaver .................... 144/145.1 |
| 5,038,646 A | * | 8/1991 | Suwitoadji ..................... 83/56 |
| 5,038,652 A | | 8/1991 | Martin et al. | |
| 5,544,558 A | | 8/1996 | Hughes | |
| 5,562,136 A | * | 10/1996 | Blackshear ............... 144/144.1 |
| 5,918,524 A | * | 7/1999 | Kirby .......................... 83/565 |
| 5,960,843 A | * | 10/1999 | Witt .......................... 144/372 |
| 6,457,469 B1 | * | 10/2002 | Mueller et al. .............. 83/886 |
| 6,470,780 B1 | * | 10/2002 | Benuzzi ....................... 83/733 |

FOREIGN PATENT DOCUMENTS

GB 2283451 A 5/1995

* cited by examiner

Primary Examiner—Allan N. Shoap
Assistant Examiner—Jason Prone
(74) Attorney, Agent, or Firm—Edwin D. Schindler

(57) ABSTRACT

A wood working tool includes a cutting blade, a carrier, which can receive wood, and a guide device associated with the carrier for causing movement past the cutting blade on a predetermined path, so that a timer carried by the carrier can be cut reproducibly to size. The carrier may have a groove which corresponds to the shape to be cut, which is received by the guide device, and on movement of the carrier, the interaction between the groove and the guide device causes the carrier to follow a required path. The tool can be provided with a device for allowing a number of similar articles to be cut from a single piece of material and the cutting of similar pieces can be effected automatically.

5 Claims, 3 Drawing Sheets

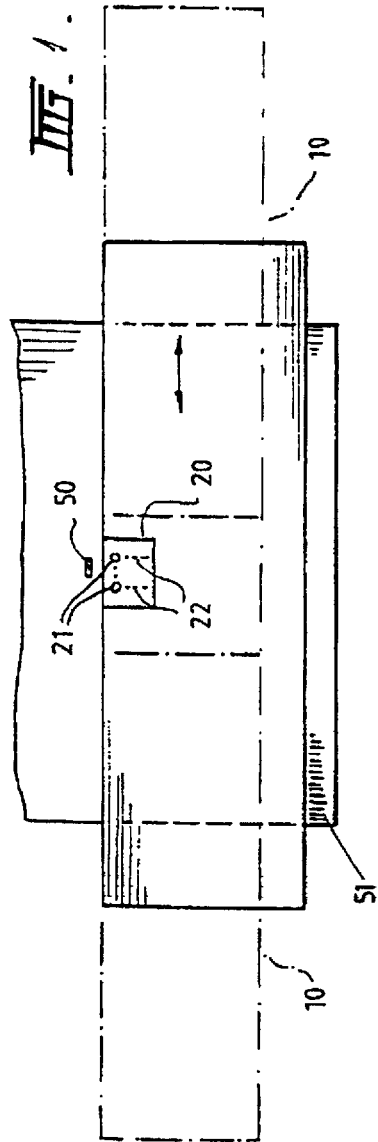
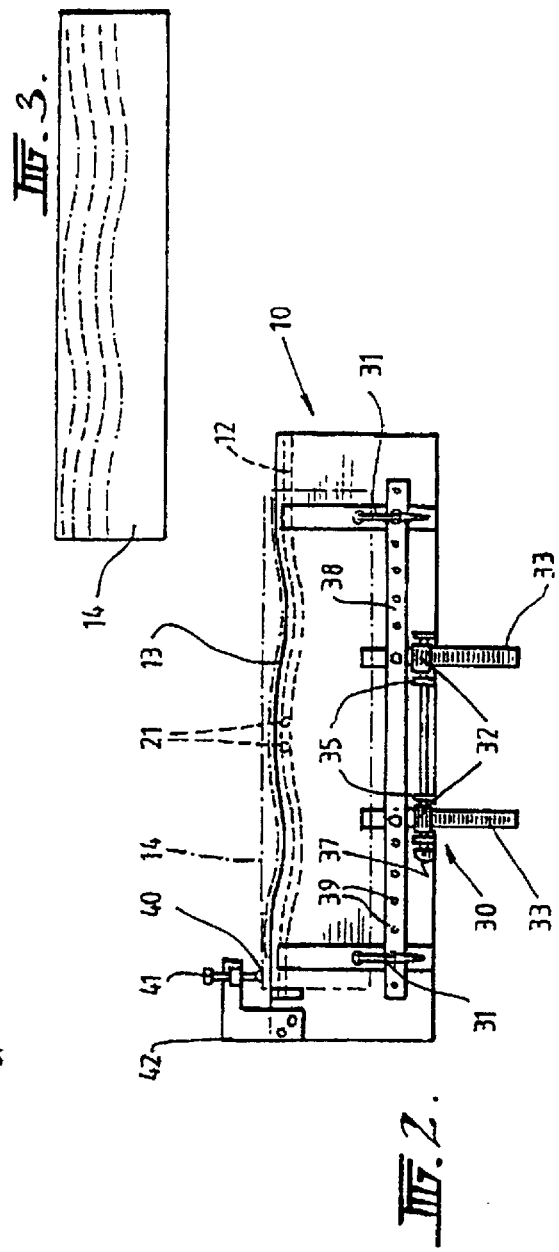

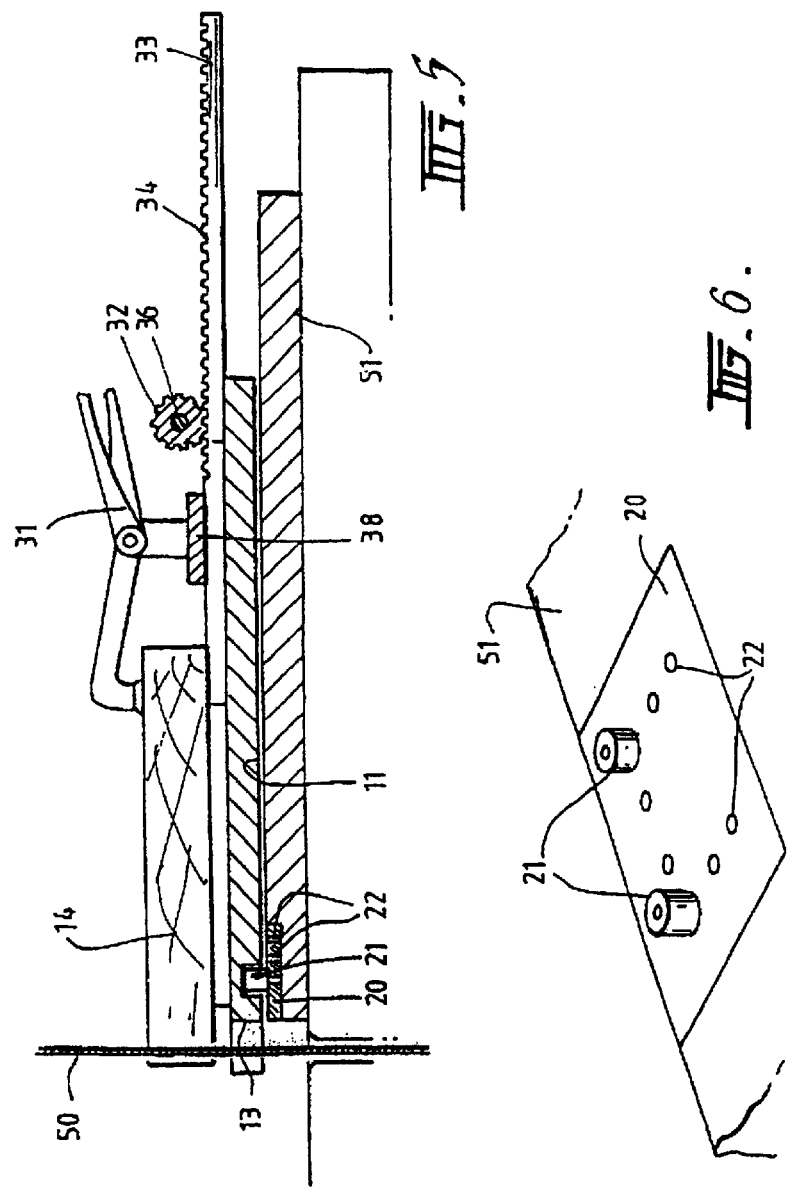

APPARATUS AND A METHOD FOR MANUFACTURING COMPLEX SHAPES

BACKGROUND OF THE INVENTION

1. Technical Field of the Invention

This invention relates to a method and apparatus for manufacturing complex shapes, and is particularly useful for use with band saws, and will be described in relation to this application.

2. Description of the Prior Art

The practice in the woodworking industry where a number of shapes have to be cut using a band saw, has been to mark each individual shape on the timber to be cut, and then for a tradesman to cut around the marking.

Whilst a skilled tradesman can do this relatively quickly and accurately it does take a substantial degree of skill and no matter how good the tradesman, the individual items are marginally different in shape, and the subsequent sanding which also acts to bring them to final shape and identity can be time consuming.

SUMMARY OF THE INVENTION

It is the object of the invention to provide means whereby articles can be manufactured specifically to shape and which will be directly reproducible.

The invention includes in a wood working tool having a cutting blade, guide means adapted to cause a carrier to move past the blade on a predetermined path, whereby timber carried by the carrier can be cut reproducibly to size.

In a first form of the invention the carrier has a groove on the underside which corresponds to the final shape required and located on the bed of the band saw are guide devices which can be received in the groove so that the carrier is constrained to follow the groove as it is moved through the saw.

BRIEF DESCRIPTION OF THE DRAWING FIGURES

In order that the invention may be more readily understood we shall describe, in relation to the accompanying drawings, one embodiment of the invention.

In these drawings:

FIG. 1 is a plan view showing the general arrangement of the device of the invention;

FIG. 2 is a plan view of the carrier of the invention;

FIG. 3 is plan view of material to be cut indicating the location of a number of parallel passes through the saw;

FIG. 5 is a section along line 5—5 of FIG. 4; and

FIG. 6 is a view showing the guides located on a plate in the base of the saw and the alternative positions these may adopt.

Figure 4:
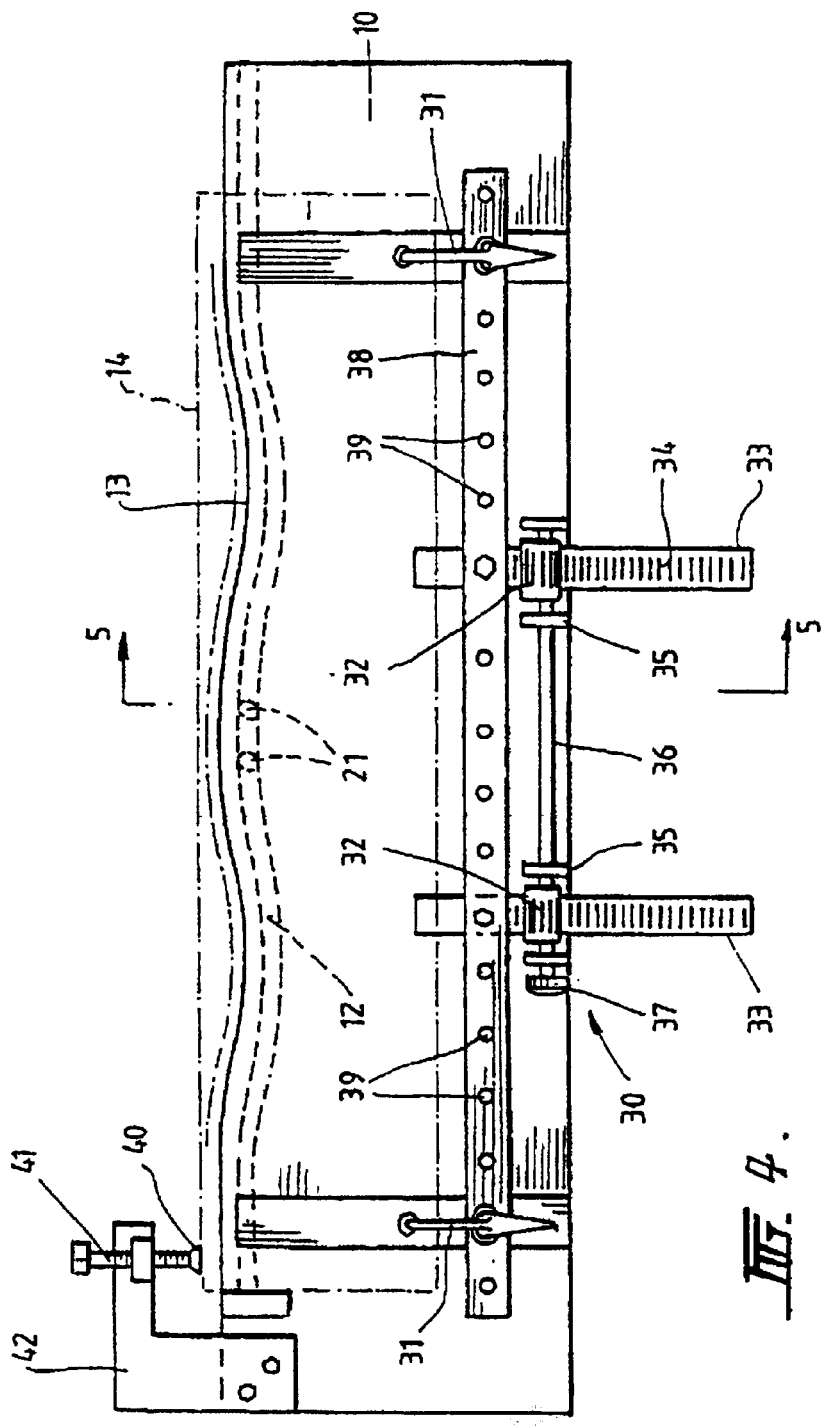
FIG. 4 is an enlarged plan view of the carrier.

In this specification, for convenience, we shall refer to the invention applied to cutting timber by a band saw but this is exemplary. The invention can also relate to the use of a router or even to a planer or sander. Where the word 'cut' is used, it is deemed to comprehend working of wood or similar material by any of these types of tools.

DETAILED DESCRIPTION OF THE DRAWING FIGURES AND PREFERRED EMBODIMENTS

The concept of the invention to move timber past the blade 50 of a band saw 51 in such a way as to cut the timber to a predetermined shape without the operator necessarily having great skill with the use of the saw.

In the illustrated embodiment, we provide a carrier 10 which may be a wooden member; although it could be made of aluminium or some other metal if it is to be used to produce a very large number of articles, and the cost of producing a metal carrier would be justified.

In may be preferred that the side of the carrier, which is directed towards the blade, has a similar curve 13 which, in use, terminates just before the blade 50 so that while the carrier 10 is moved past the blade, there is no direct contact between the blade and the carrier, but at all times, the carrier is close to the blade to give good support to timber or similar material 14 located on the carrier.

Alternatively the carrier could be made so that its width is such that, at the closest point of the groove to the blade, the carrier is spaced from the blade by a small distance and, of necessity and every other position is spaced from the blade by a further distance.

The first of these arrangements is preferred basically because, as mentioned, it supports the timber 14 being cut throughout the length of the cut but if this is not necessary, the other form may be cheaper.

Fitted to the carrier there is a clamp assembly 30 which is adapted to hold the timber being cut and this includes quick release clamps 31 to enable a piece of timber 14 to be located and removed from the carrier rapidly. The actual form of clamp is not particularly critical to the invention. There are a number of types of clamps known in the woodworking industry which would equally well be useable with the invention.

The clamp assembly can include a rack drive pinions 32 which are connected to the carrier by trunnions 35 and has a pair of racks 33 which are at right angles to the longitudinal axis the carrier.

These racks 33 may be in grooves 34 or the like of the assembly 30.

The pinions 32 are connected by a rod 36 to which there is a drive knob 37 connected.

Connected between the racks 33 there is a beam 38 to which, in turn, the clamps 31 are connected, the connection being possible at a number of positions depending on the length of the timber to be cut. The beam may be provided with a number of apertures 39 to provide connecting means for the clamp so that the clamps can be spaced to give a good support for timber of different lengths. As illustrated there are two clamps 31 but there could be more than this if required.

If required, fitted to the other side of the carrier 11, there is a stop 40 which is directed inwardly towards the body of the carrier and which may be adjustable by means of a clamp or the like 41. This may be supported by a bracket 42 connected to the carrier.

The clamps 31 may be adapted to rest on the upper surface of the timber 14 to be cut and may be formed to ensure that the timber is held firmly as will be necessary when the timber is being cut or being moved.

As illustrated, in FIG. 6, the guide members 21 can be located on a plate 20, which is adapted to be set into the base 51 of the band saw, or an auxiliary base adapted to fit over the saw's original base can be provided, which auxiliary base is provided with a pair of guide members 21. As illustrated, the guide members 21 may be rollers, having their axes normal to the base and which are spaced apart along a line parallel to the blade of the saw.

The guide members 21 can be connected to the plate 20 at a number of positions 22 so as to be moveable to be nearer or further apart or closer or further from the blade. The positions 22 are shown to be apertures to which the guide members can be connected.

Where there are relatively slow curves it is desirable to have the guide members apart to give maximum stability and reproducibility.

Where the curves are relatively tight then to get the best following of the curves it is desirable to have the guide members closer together.

In a modified form of the invention, the guide members can be located in a slot along which they are moveable and the members are made biassed towards the opposite sides of the slot. In this arrangement, the optimum positioning of the guide members will occur automatically. Where the members are moving along a line effectively parallel to the saw blade, they will adopt positions at each side of the slot, as the curve becomes sharper, they will move closer together against their bias and the degree of movement will depend on the sharpness of the curve. When the curve again becomes shallower, they will move apart.

Rather than using a cutout groove 12 in the underside of the carrier member 10, we could have a pair of grooves which are parallel and spaced, or even a central portion which is downwardly extending and which has on each side, the same shape and guide members on the exterior of this, against which the, movement could occur.

When the device is to be used the timber 14 to be cut is located on the carrier 10 and clamped thereto by clamps 31.

If the carrier has its inner edge in the required curve the first possibility discussed above, the timber must be clamped so that it overlays the carrier throughout the length of the carrier.

This location can be achieved by the use of the stop member 40 which, after location has been completed, may be removed so as to cause no obstruction to the movement of the saw blade 50.

When the timber or other material is located, the carrier/timber combination is caused to move past the band saw blade, the constraints on the carrier by the groove 12 cooperating with the guide means 21 are such that the timber passes through the band saw and because of the transverse movements of the carrier forced on it by the groove, the required shape is provided on the edge thereof.

If, of course, a cut is being made for a second side of a member, assuming a member is to be symmetrical, then the timber must extend from the carrier by a distance equal to the required width of the member to be manufactured. This can be controlled by the location of the stop 40 and the manipulation of the knob 37, which causes the timber to be moved over the surface of the carrier and outwardly therefrom. Thus, by variation of the position of the stop 40, or control of the rack knob 37, the width of the timber being cut can be varied.

The operator would be at the end of the carrier at the left of FIG. 4 so can remove the cut portions as cutting is completed, move the carrier backwards and then operate the rack knob until the timber reaches the stop 40.

It will be seen that correctly used the device of the invention can, not only, ensure that curves in timber, or for that matter plastic or other soft material, can be very closely replicated on separate pieces of timber or other material but also such curves can be replicated on two different sides of a single piece of timber, so that such articles as chair legs or arms which are curved can be readily manufactured and the devices so manufactured can be of extremely close tolerance, needing a minimum of finishing in the form of sanding or the like. Also, where a piece of timber wider than the required width of the article is used, two or several articles can be cut repetitively from the one piece of timber. This is shown on FIG. 3 where a number of articles are shown dashed on the surface of a piece of timber.

It is possible to control the movement of the racks automatically so then when one piece of timber has been cut, and the carrier returned to its initial condition, the timber will be moved forwardly to automatically adopt the required position for the next cut. It is also possible to automate the cutting movements so that not only is the timber moved transversely when a cut is completed and the carrier is returned to its initial position but also to automate the carrier return so that there is little operator input once the timber is loaded onto the carrier until all of the possible components are cut.

It will be seen that the invention provides something which has not previously been available in the art and that is direct reproducibility of a particular shape without any necessity of marking and without the need for great skill in passing the timber being sawn through the band saw or other tool.

I claim:

1. A woodworking tool, comprising:
    a base;
    a cutting tool fixed relative to said base;
    a carrier for carrying a workpiece material; and,
    means for guiding said carrier passed said cutting tool on a transverse, predetermined variable path, so that the workpiece material carried by said carrier is reproducibly cut to size, said means for guiding including a plurality of guide devices and a groove with one guide device of said plurality of guide devices being fixed relative to said cutting tool and remaining guide devices of said plurality of guide devices being movable relative to said cutting tool, so that when said carrier is moved said plurality of guide devices enter the groove with an interaction between the groove and the plurality of guide devices causing said carrier to adopt and follow said transverse, predetermined variable path.

2. The woodworking tool according to claim 1, wherein said plurality of guide devices comprise upwardly directed members for permitting the groove to pass thereover with minimum resistance.

3. The woodworking tool according to claim 1, wherein said plurality of guide devices are spaced apart from one another depending upon a radius of curvature being cut from the workpiece material.

4. The woodworking tool according to claim 1, wherein an edge of said carrier directed toward said cutting tool is shaped to have a same shape as that of a required cut of the workpiece material, so that the workpiece material being cut is closely supported to a position of the required cut being made.

5. The woodworking tool according to claim 1, wherein said woodworking tool is a band saw.

* * * * *